April 26, 1955

B. O. AUSTIN ET AL 2,707,264

GENERATOR CONTROL SYSTEM

Filed Sept. 13, 1952

WITNESSES:
E. A. M'Closkey.
Leon M. Garman.

INVENTORS
Bascum O. Austin
and Alfred A. Lighty.
BY
F. P. Lyle
ATTORNEY.

United States Patent Office 2,707,264
Patented Apr. 26, 1955

2,707,264

GENERATOR CONTROL SYSTEM

Bascum O. Austin and Alfred A. Lighty, Lima, Ohio, assignors to Westinghouse Electric Corporation, East Pittsburgh, Pa., a corporation of Pennsylvania Application September 13, 1952, Serial No. 309,520

6 Claims. (Cl. 322—25)

The present invention relates to generator control systems, and more particularly to control and regulating means for direct-current generators.

The control and regulating means of the present invention is especially suitable for direct-current generators used for ground power supplies for aircraft, although its usefulness is not limited to this particular application. Such generators are used as portable power supplies which are intended to be connected to the electrical system of an airplane to supply power when the plane is on the ground, usually for the primary purpose of starting the airplane engines. The present invention provides a control system which provides a simple and convenient means for controlling the voltage and current of such generators to provide controlled current for the starting of airplane engines, particularly jet engines.

The principal object of the invention is to provide means for controlling and regulating the output current and voltage of a direct-current generator.

Another object of the invention is to provide control and regulating means for a direct-current generator which will maintain substantially constant generator voltage from no load until the output current has reached a predetermined maximum value, and which will thereafter maintain the current substantially constant at the predetermined maximum.

A further object of the invention is to provide control and regulating means for a direct-current generator which will maintain substantially constant generator voltage until the output current reaches a predetermined maximum and which will thereafter maintain substantially constant current, and which includes simple adjusting means for changing or adjusting the value of the regulated maximum current.

Figure 1:
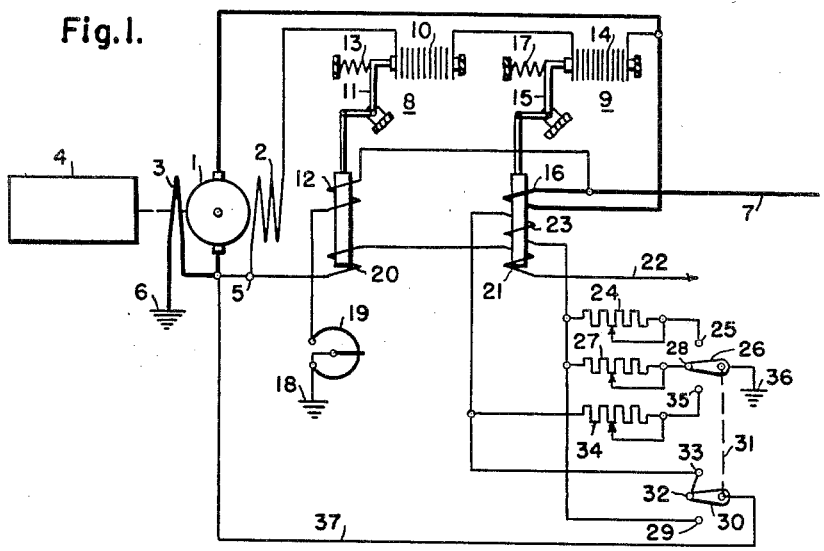
Figure 2:
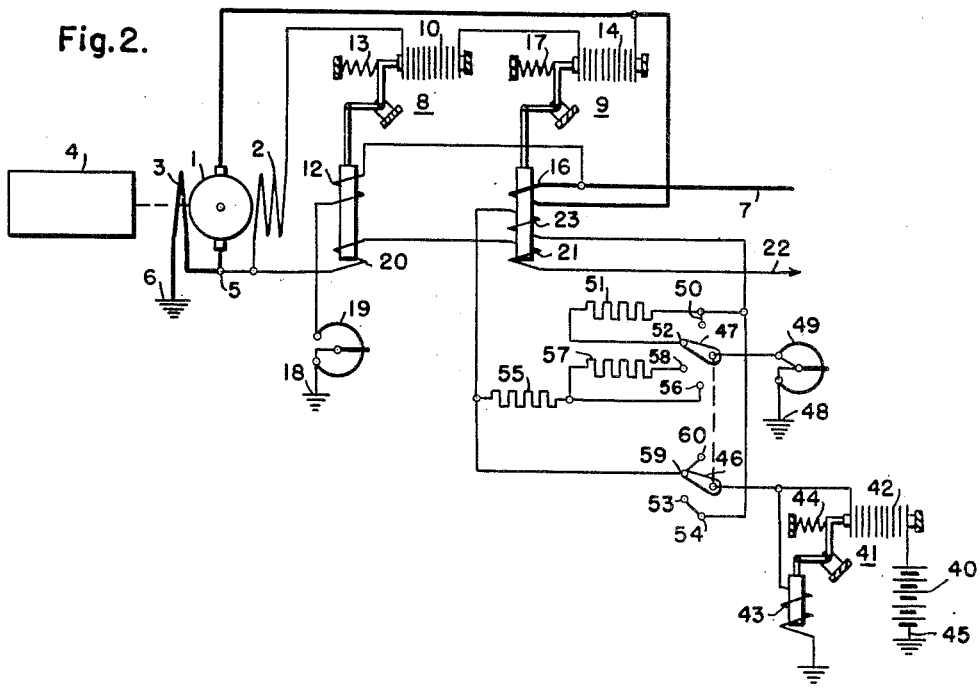

Other objects and advantages of the invention will be apparent from the following detailed description, taken in connection with the accompanying drawing, in which:

Figure 1 is a schematic diagram showing a preferred embodiment of the invention; and Fig. 2 is a similar diagram showing a modified embodiment.

The new control system is shown in Fig. 1 applied to a direct-current generator 1 having a shunt field winding 2 and a series field winding 3. The generator 1 may be driven by a prime mover 4 of any suitable type, such as an internal combustion engine, and may be portable for use as a ground power supply for aircraft. The series field winding 3 is connected between one terminal of the generator, preferably the negative terminal 5, and ground 6, although it will be understood that a wire return circuit might be used rather than a ground return. The other terminal of the generator 1 is connected to a bus 7 for connection to a load which, as indicated above, may be the electrical system of an airplane or a starting motor for starting an airplane engine, the load being connected between the bus 7 and ground.

The generator 1 is controlled by means of a voltage regulator 8 and a current regulator 9. The regulators 8 and 9 may be of any suitable type and are shown as being carbon-pile regulators. The voltage regulator 8 has a carbon pile 10 which is compressed by a pressure mechanism 11, of any suitable type, controlled by a coil 12 acting in opposition to a spring 13. The current regulator 9 similarly has a carbon pile 14 compressed by a pressure mechanism 15 controlled by a coil 16 acting in opposition to a spring 17. The carbon piles 10 and 14 of the regulators 8 and 9 are connected in series with the shunt field winding 2 of the generator across the generator terminals, so that variation of the resistance of either of the carbon piles varies the shunt field current and thus the voltage of the generator 1.

The coil 12 of the voltage regulator 8 is connected between the bus 7 and ground 18, in series with a voltage-adjusting rheostat 19, so that the coil 12 is connected across the generator and responds to the generator voltage. The coil 16 of the current regulator 9 is a series coil designed to carry heavy currents and is connected directly in series with the generator between the generator and the bus 7, so as to carry the generator output current to cause the regulator 9 to respond to the generator output current. If the generator 1 is to be operated in parallel with one or more other generators connected to the bus 7, paralleling coils 20 and 21 are preferably also provided on the regulators 8 and 9. The coils 20 and 21 are connected in series between the negative terminal 5 of the generator and a paralleling bus 22 adapted for connection to similar coils on the regulators of the paralleled generator or generators, so that the paralleling coils respond to the voltages across the series fields of the generators and act to cause the regulators to maintain proper load division. If the generator 1 is to be used alone, the paralleling coils 20 and 21 may be omitted.

In the operation of the system as so far described, if the generator is supplying a current below the setting of the current regulator 9, the voltage regulator 8 will operate to control the current in the shunt field winding 2 to maintain substantially constant generator voltage. The current regulator 9 will have no effect at this time since the generator current is below its setting and it will, therefore, be in its position of minimum resistance. As the load demand on the generator increases and the current rises to the maximum value to be permitted, for which the current regulator 9 is set, the regulator 9 will become effective since it responds to the output current, and it will increase its resistance to control the field current to maintain constant output current. Thus, the regulator 9 will act to decrease the voltage, and under these conditions the voltage regulator 8 will be in its position of minimum resistance so that it will not affect the operation of the system. If the load demand drops, so that the current decreases below the current regulator setting, and the voltage increases to the setting of the voltage regulator 8, the regulator 8 will again take over control and maintain constant voltage. Thus, it will be seen that the operation of the system is to maintain constant generator voltage when the output current is below a predetermined maximum value, and to limit the current to the predetermined maximum and maintain it at that value by reducing the generator voltage when the load demand increases.

It is desirable to provide for adjusting or changing the setting of the current regulator 9 to provide several different values of maximum output current which the current regulator 9 will maintain, and for this purpose an adjusting coil 23 is provided on the regulator 9. The coil 23 is a coil having a relatively large number of turns, and it is wound on the magnetic circuit of the regulator so as to either aid or oppose the coil 16, depending upon the direction of excitation of the coil 23. In the preferred embodiment shown in Fig. 1, the coil 23 is excited by the voltage across the series field 3 of the generator which, of course, is substantially constant when the regulator 9 is acting to maintain constant generator current.

As shown in Fig. 1, switching means are provided to give three different settings of the current regulator 9 by changing the excitation of the adjusting coil 23, although more than three settings might be provided if desired. One end of the coil 23 is connected through an adjustable resistor 24 to a contact 25 of a selector switch 26 and also through an adjustable resistor 27 to a second contact 28. The same end of the coil 23 is also connected to a contact 29 of a selector switch 30 which is mechanically connected to the switch 26 so that the two switches operate together, as indicated by the dotted connection 31. The other end of the coil 23 is connected to the contacts 32 and 33 of the selector switch 30 and also through an adjustable resistor 34 to a contact 35 of the switch 26. The switch 26 is connected to ground at 36 and the switch 30 is connected to the negative terminal 5 of the generator 1 by a conductor 37.

It will be seen that when the switch 26 is on either of the contacts 25 or 28, with the switch 30 on the corresponding contact 33 or 32, the coil 23 is connected directly across the series field 3 in series with one or the other of the resistors 24 or 27, so that two different values of excitation of the coil 23 are thus available, which may, for example, be additive with the coil 16, thus giving two different current settings of the regulator 9. If the switch 26 and switch 30 are placed on the contacts 35 and 29, respectively, the coil 23 is connected across the series field 3 in series with the resistor 34, but with its polarity reversed so that it opposes the coil 16, thus providing a third current setting for the regulator. By using the voltage across the series field in this way to energize the adjusting coil 23, a simple adjusting means is provided for changing the current setting of the regulator 9 to adjust the value of the maximum generator output current which is maintained by the regulator.

Fig. 2 shows an alternative means of energizing the adjusting coil of the current regulator 9. The system shown in this figure is the same as that of Fig. 1, and the elements of the system have been designated by the same reference numerals. In this modification, however, the adjusting coil 23 of the current regulator 9 is energized from a separate direct-current source, which is indicated as a battery 40. The voltage applied to the coil is maintained substantially constant by means of a regulator 41 comprising a carbon pile 42 actuated by a coil 43 acting in opposition to a spring 44. One terminal of the battery 40 is connected to ground at 45, and the other end is connected in series with the carbon pile 42 to a selector switch 46. The regulator coil 43 is connected across the battery and carbon pile, as shown, and controls the series resistance so as to maintain substantially constant voltage on the coil 23. The excitation of the coil 23 is controlled by the selector switch 46 and a second selector switch 47 which is connected to ground at 48 through a rheostat 49. The two switches are mechanically connected for simultaneous operation. One end of the coil 23 is connected to a contact 50 and through a resistor 51 to a contact 52, and is also connected directly to contacts 53 and 54. The other end of the coil 23 is connected through a resistor 55 to a contact 56 and through a second resistor 57 to a contact 58, and is also connected directly to contacts 59 and 60. It will be seen that when the switches 46 and 47 are on the contacts 50 and 60 or 52 and 59, respectively, the coil 23 is connected across the battery 40 either directly or in series with the resistor 51, thus giving two different settings of the regulator 9. If the switches 46 and 47 are on the contacts 53 and 58, or 54 and 56, respectively, the excitation of the coil 23 is reversed, and it is connected either through the resistor 55 alone or through the two resistors 55 and 57, thus giving two additional current settings for the regulator. It will be understood that any suitable constant-voltage source might be used in this embodiment of the invention for excitation of the adjusting winding 23, and that in either embodiment any suitable switching arrangement may be used for providing different values of excitation to provide the desired number of steps of adjustment of the current setting of the regulator 9.

It should now be apparent that a control system has been provided for direct-current generators which operates to maintain constant voltage from no load until a predetermined maximum output current is reached after which, as the load increases, the voltage is decreased to maintain substantially constant current. This system is particularly suitable in a ground power supply for providing controlled currents for the starting motors on airplanes for starting jet engines, but it will be obvious that its usefulness is not restricted to this particular application and it may be used wherever control of a direct-current generator in the manner described is desired.

Certain specific embodiments of the invention have been shown and described for the purpose of illustration, but it will be obvious that various modifications and other embodiments are possible within the scope of the invention, and it is to be understood that the invention is not limited to the specific arrangements shown, but includes all equivalent embodiments and modifications.

We claim as our invention:

1. In combination, a direct-current generator having a shunt field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermined maximum value, the coil of the second regulator being connected to be responsive to the generator output current to maintain a constant maximum output current, the second regulator also having an adjusting coil, means for exciting said adjusting coil from a substantially constant voltage, and means for changing the magnitude and direction of excitation of said adjusting coil to change the value of said maximum generator output current.

2. In combination, a direct-current generator having a shunt field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermined maximum value, the coil of the second regulator being connected to be responsive to the generator output current to maintain a constant maximum output current, the second regulator also having an adjusting coil, means for exciting said adjusting coil from a substantially constant voltage, and switching means for connecting resistors of different values in series with said adjusting coil and for reversing the direction of excitation of the adjusting coil to change the value of said maximum generator output current.

3. In combination, a direct-current generator having a shunt field winding and a series field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermined maximum value, the coil of the second regulator being connected to be responsive to the generator output current to maintain a constant maximum output current, the second regulator also having an adjusting coil connected across the generator series field winding, and means for changing the magnitude and direction of excitation of said adjusting coil to change the value of said maximum generator output current.

4. In combination, a direct-current generator having a shunt field winding and a series field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermined maximum value, the coil of the second regulator being connected to be responsive to the generator output current to maintain a constant maximum output current, the second regulator also having an adjusting coil connected across the generator series field winding, and switching means for connecting resistors of different values in series with said adjusting coil and for reversing the direction of excitation of the adjusting coil to change the value of said maximum generator output current.

5. In combination, a direct-current generator having a shunt field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermined maximum value, the coil of the second regulator being connected to be responsive to the generator output current to maintain a constant maximum output current, the second regulator also having an adjusting coil, an independent substantially constant-voltage source of excitation for said adjusting coil, and means for changing the magnitude and direction of excitation of said adjusting coil to change the value of said maximum generator output current.

6. In combination, a direct-current generator having a shunt field winding, first and second regulators for controlling the current in said shunt field winding, each of said regulators having a variable resistance means and a coil for actuating the variable resistance means to vary its resistance, the variable resistance means of both regulators being connected in series in the circuit of the shunt field winding, the coil of the first regulator being connected to be responsive to the generator voltage to maintain constant generator voltage when the generator output current is below a predetermind maximum value, the coil of the second regulator being connected to be responsive to the generator output current to maintain a constant maximum output current, the second regulator also having an adjusting coil, an independent source of direct-current excitation for said adjusting coil, means for maintaining the voltage of said source substantially constant, and switching means for connecting resistors of different values in series with said adjusting coil and for reversing the direction of excitation of the adjusting coil to change the value of said maximum generator output current.

References Cited in the file of this patent

UNITED STATES PATENTS

| | | |
|---|---|---|
| 1,004,379 | Creveling | Sept. 26, 1911 |
| 2,468,228 | Neild | Apr. 26, 1949 |